United States Patent
Shachaf et al.

(10) Patent No.: US 12,124,608 B2
(45) Date of Patent: Oct. 22, 2024

(54) COMPUTERIZED-METHOD AND COMPUTERIZED-SYSTEM FOR SENSITIVE DATA REDACTION FROM SCREENSHOTS

(71) Applicant: NICE LTD., Ra'anana (IL)

(72) Inventors: Yuval Shachaf, Even Yehuda (IL); Yaron Bialy, Madrid (ES); Eran Roseberg, Hogla (IL)

(73) Assignee: NICE LTD., Ra'anana (IL)

( * ) Notice: Subject to any disclaimer, the term of this patent is extended or adjusted under 35 U.S.C. 154(b) by 261 days.

(21) Appl. No.: 17/974,554

(22) Filed: Oct. 27, 2022

(65) Prior Publication Data

US 2024/0143828 A1    May 2, 2024

(51) Int. Cl.
*G06F 21/62* (2013.01)
(52) U.S. Cl.
CPC ................ *G06F 21/6245* (2013.01)
(58) Field of Classification Search
CPC .................................................. G06F 21/6245
See application file for complete search history.

(56) References Cited

U.S. PATENT DOCUMENTS

| | | | | |
|---|---|---|---|---|
| 9,519,794 B2* | 12/2016 | Fox | ............... | G06F 21/6245 |
| 10,382,620 B1* | 8/2019 | Allen | ............... | H04M 1/72463 |
| 2015/0161406 A1* | 6/2015 | Fox | ............... | G06F 21/6245 726/27 |
| 2016/0103811 A1* | 4/2016 | Cullen | ............... | G06F 40/166 715/256 |
| 2017/0220813 A1* | 8/2017 | Mullins | ............... | G06F 16/93 |
| 2018/0330385 A1* | 11/2018 | Johnson | ............... | G06Q 10/107 |
| 2020/0042837 A1* | 2/2020 | Skinner | ............... | H04L 63/102 |
| 2020/0151345 A1* | 5/2020 | Chauhan | ............... | G06F 21/16 |
| 2020/0185091 A1* | 6/2020 | Davis | ............... | G16H 10/40 |
| 2023/0237180 A1* | 7/2023 | Scott | ............... | G06N 3/008 726/28 |
| 2023/0394030 A1* | 12/2023 | Garg | ............... | G06F 3/03543 |
| 2024/0143828 A1* | 5/2024 | Shachaf | ............... | G06F 21/6245 |

* cited by examiner

*Primary Examiner* — Simon P Kanaan
(74) *Attorney, Agent, or Firm* — SOROKER AGMON NORDMAN RIBA

(57) ABSTRACT

A computerized-method for sensitive data redaction from screenshots, is provided herein. The computerized-method includes retrieving records of a sequence of screenshots from a database. Then, grouping the sequence-of-screenshots by one feature of one or more features to yield one or more groups. Each group includes screenshots having one common feature. Then, calculating a score for each pixel across all similar screenshots in each group. For each group of screenshots, blackening pixels in all screenshots having a score above a preconfigured threshold to yield data redacted screenshots. The score of each pixel above the preconfigured threshold indicates a high variance between screenshots in the group and a presence of sensitive data therein and then storing the data-redacted screenshots in a screenshots-database.

15 Claims, 15 Drawing Sheets

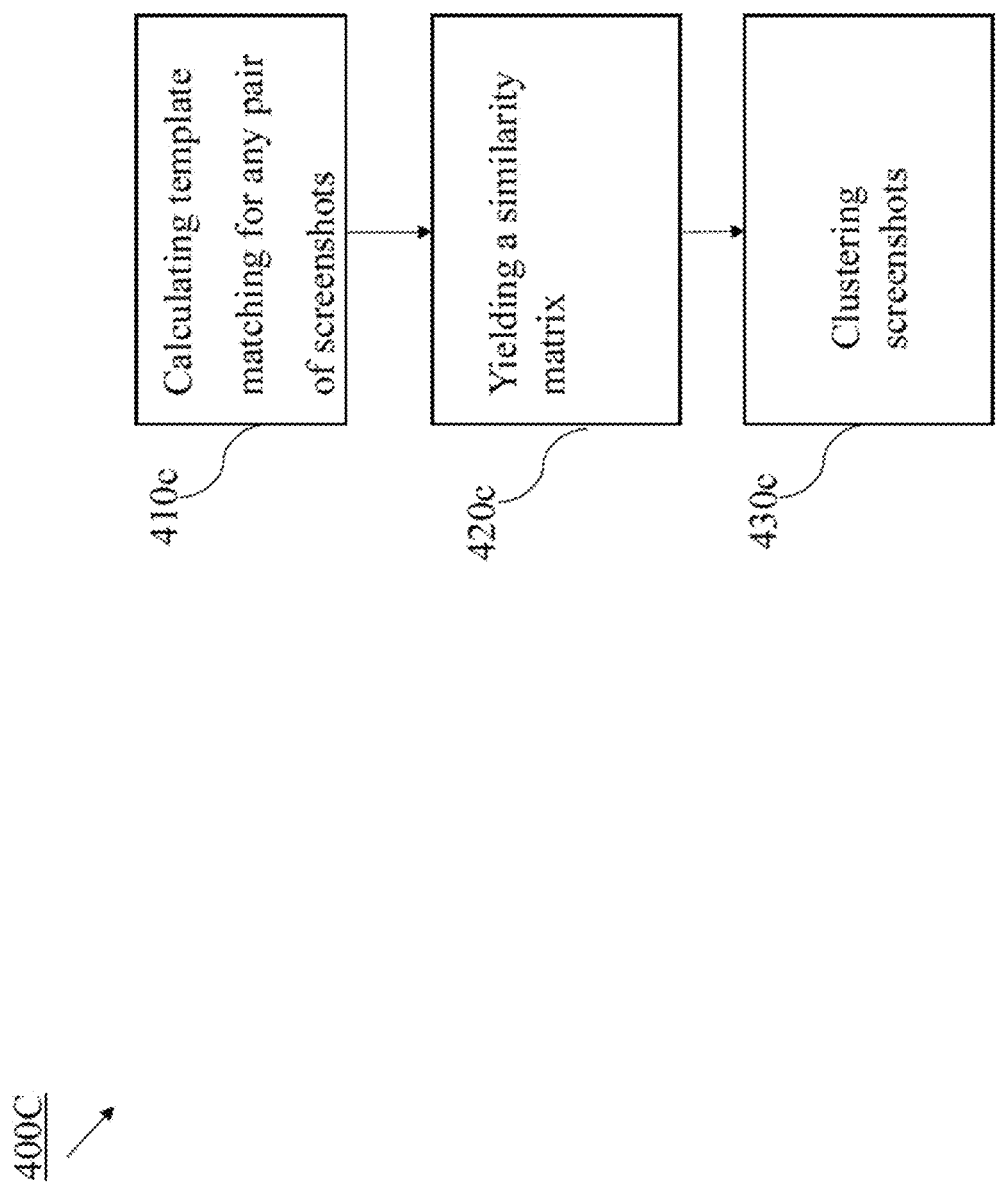

| -   | 1 | 2 | 3 | 4 | 5 |
|-----|-------|-------|-------|-------|-------|
| 1 | 1   | 0.2 | 0.8 | 0.5 | 0.7 |
| 2 | 0.2 | 1   | 0.4 | 0.1 | 0.1 |
| 3 | 0.8 | 0.4 | 1   | 0.2 | 0.9 |
| 4 | 0.5 | 0.1 | 0.2 | 1   | 0.8 |
| 5 | 0.7 | 0.1 | 0.9 | 0.8 | 1   |

Figure 11

COMPUTERIZED-METHOD AND COMPUTERIZED-SYSTEM FOR SENSITIVE DATA REDACTION FROM SCREENSHOTS

TECHNICAL FIELD

The present disclosure relates to the field of image redaction, and more specifically to sensitive data redaction from screenshot images.

BACKGROUND

Screenshots, such as screen recordings of applications which are operated by users, may be a useful tool to give context to an external user, such as a business analyst. However, before providing the screenshots to users for review, sensitive data should be redacted from the screenshots. Meaning, that sensitive data presented, such as customer personal details, bank details, health details and the like, in the reviewed screenshots, has to be blackened for privacy protection purposes.

Currently, there are technical solutions for image redaction, however these solutions require a tremendous amount of time of processing of approximately 1 second per screenshot. Accordingly, current solutions have to limit the number of users, that their work generates screenshots, to be stored in a database, because the pace in which the screenshots arrive at the storage is greater than the pace of the process of screenshots redaction which causes screenshots for redaction to accumulate.

Moreover, the use of current solutions of Optical Character Recognition (OCR) and object detection not only accommodates large time complexity, but also prone to errors and involves a slow mechanism of screenshot comparisons and aggregations.

Identifying sensitive information in the screenshots assumes key-value text fields with high value variability per key. Often, it may be challenging as it heavily depends on the OCR quality and having a strong tradeoff with process time. For example, considering 10 users where each user is producing 5000 screenshots a day, while working on one or more applications, where the process of redaction takes approximately 1 second on average to redact an image end-to-end, it results in 50K seconds, which translated into about 14 hours.

Accordingly, there is a need for a technical solution to reduce the redaction time, e.g., by replacing the OCR usage.

SUMMARY

There is thus provided, in accordance with some embodiments of the present disclosure, a computerized-method for sensitive data redaction from screenshots.

In accordance with some embodiments of the present disclosure, the computerized-method may include retrieving records of a sequence of screenshots from a database. Each record of a screenshot in the sequence of screenshots, may include an Image Globally Unique Identifiers (GUID), one or more features of the screenshot. Then, grouping the sequence of screenshots by one feature of the one or more features to yield one or more groups. Each group may include screenshots having one common feature. Optionally, the grouping may be based on more than one common feature.

Furthermore, in accordance with some embodiments of the present disclosure, after the grouping, the computerized-method may further comprise calculating a score for each pixel across all screenshots in each group. Then, for each group of screenshots, blackening pixels in all screenshots having a score above a preconfigured threshold to yield data redacted screenshots. The score of each pixel above the preconfigured threshold may indicate a high variance between screenshots and a presence of sensitive data therein. Then, storing the data-redacted screenshots in a screenshots-database.

Furthermore, in accordance with some embodiments of the present disclosure, the sequence of screenshots has been generated when a user has operated one or more applications and the sequence of screenshots may be stored in the database.

Furthermore, in accordance with some embodiments of the present disclosure, the one or more features may be selected from at least one of: (i) application name: (ii) agent-name; and (iii) window-title.

Furthermore, in accordance with some embodiments of the present disclosure, after the grouping of the sequence of screenshots, the computerized-method may further include operating a module for image rescaling for each screenshot to reduce running-time of the calculating of the score. The computerized-method may further include, operating images preprocessing algorithms on the screenshots to improve accuracy of the calculating of the score.

Furthermore, in accordance with some embodiments of the present disclosure, the data-redacted screenshots may be uploaded from the screenshots-database to a server in a cloud network.

Furthermore, in accordance with some embodiments of the present disclosure, the images preprocessing algorithms may include at least one of: gray-scaling of each screenshot in the sequence of screenshots, and operating edge-detection models on each screenshot in the sequence of screenshots.

Furthermore, in accordance with some embodiments of the present disclosure, the image-rescaling may be to a preconfigured size of an original size of each screenshot.

Furthermore, in accordance with some embodiments of the present disclosure, the calculating of the score may be operated by a matrix similarity module, which may calculate a similarity score. The matrix similarity module may use an image similarity algorithm to compute similarity between each pair of screenshots from the sequence of screenshots and to yield a similarity matrix.

Furthermore, in accordance with some embodiments of the present disclosure, each record of a screenshot in the sequence of screenshots may further include a dimension and when screenshots in a pair of screenshots do not have similar dimension then a computed similarity may equal zero.

Furthermore, in accordance with some embodiments of the present disclosure, the computerized-method may further include applying the yielded similarity matrix to a hierarchical clustering algorithm in each group and cutting a hierarchical tree by a preconfigured threshold to yield homogenous groups in terms of User Interface (UI) elements where values of the UI elements are different in each screenshot in each group.

Furthermore, in accordance with some embodiments of the present disclosure, the similarity matrix module may be template matching and the template matching may be employed on two screenshots of similar dimension to yield the similarity matrix.

Furthermore, in accordance with some embodiments of the present disclosure, each screenshot may be an image which may be maintained in the database in an encoded format and after retrieval of each screenshot it may be decoded.

Furthermore, in accordance with some embodiments of the present disclosure, the blackening of pixels may be further operated on pixels in a preconfigured radius from the pixels having a score above the preconfigured threshold.

Furthermore, in accordance with some embodiments of the present disclosure, the score may be calculated based on Standard Deviation (STD) or any other mean of score to measure variability. For example, entropy of each pixel in the screenshots in each cluster in the one or more groups or randomness.

There is further provided, in accordance with some embodiments of the present disclosure, a computerized-system for sensitive data redaction from screenshots.

Furthermore, in accordance with some embodiments of the present disclosure, the computerized-system may include one or more processors, a database, a screenshots-database; and a memory to store the plurality of databases.

Furthermore, in accordance with some embodiments of the present disclosure, the one or more processors may be configured to: (i) retrieve records of a sequence of screenshots from the database. Each record of a screenshot in the sequence of screenshots may include an Image Globally Unique Identifiers (GUID), one or more features of the screenshot; (ii) group the sequence of screenshots by one feature of the one or more features to yield one or more groups. Each group may include screenshots having one common feature: (iii) calculate a score for each pixel across all screenshots in each group. For each group of screenshots, the computerized-method may further blacken pixels in all screenshots having a score above a preconfigured threshold to yield data redacted screenshots. The score of each pixel above the preconfigured threshold may indicate a high variance between screenshots and a presence of sensitive data therein, and (iv) store the data-redacted screenshots in the screenshots-database. Optionally, each processor may work on one group of screenshots.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 4A-4D schematically illustrate a high-level workflow of sensitive data redaction, in screenshots, in accordance with some embodiments of the present invention;

FIG. 11 shows an example of a similarity matrix of five screenshots, in accordance with some embodiments of the present invention.

DETAILED DESCRIPTION

Figure 1:
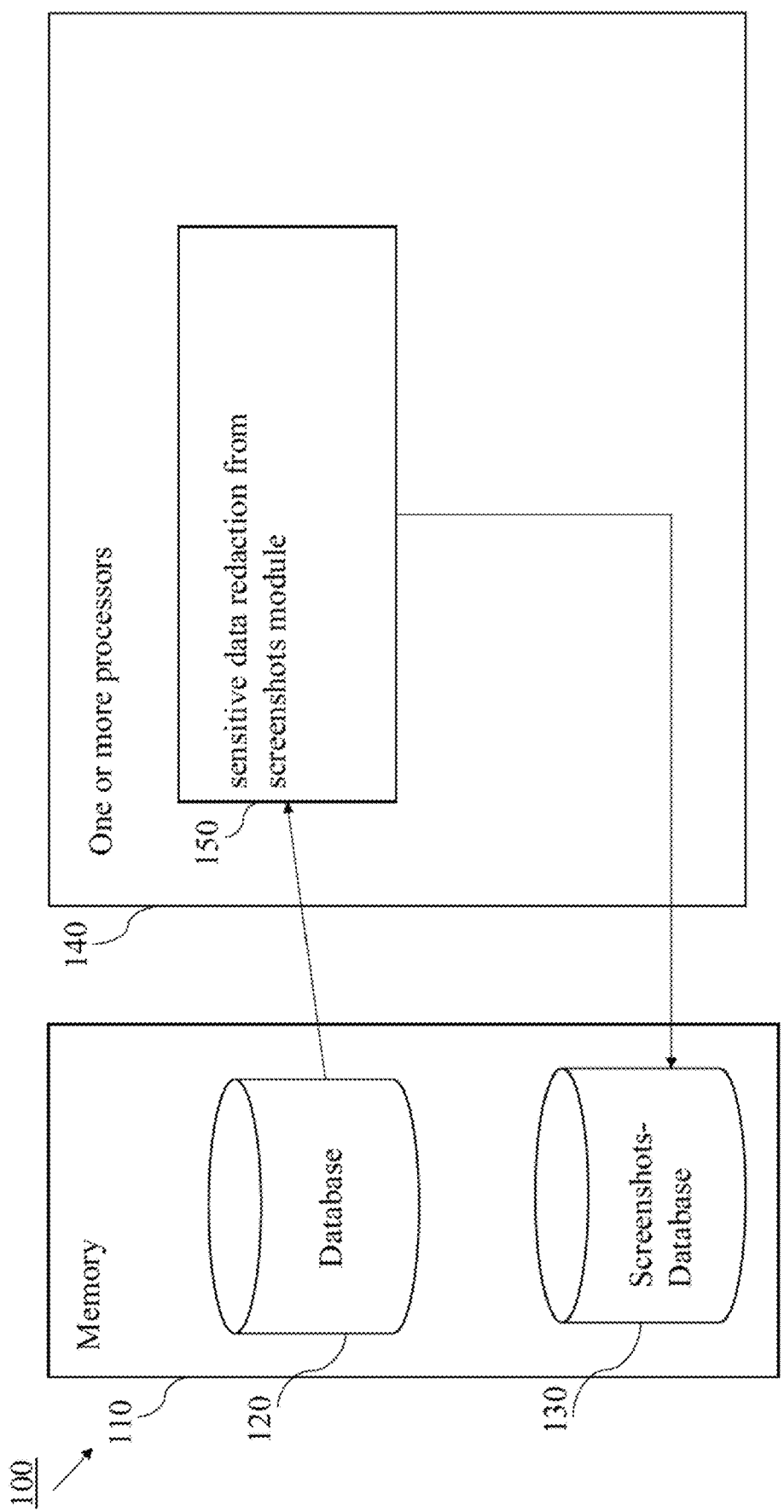
FIG. 1 schematically illustrates a high-level diagram of a computerized-system for sensitive data redaction from screenshots, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The terms "size" and "dimension" are interchangeable.

The term "screenshot" as used herein refers to any screen recording or digital image of contents of a computer display, e.g., when a user is operating one or more applications.

The term "pixel" as used herein refers to a pair of integers having a column number and a row number.

Screenshots are used as a tool for users. Commonly they are generated during work time of users and then stored in a local database or uploaded to a cloud-based environment. However, before the screenshots are reviewed by other users, it has to be redacted from sensitive data, e.g., sensitive data in the screenshots has to be blackened.

In task-mining operations, the screenshot images may give a reviewer, such as a business analyst, the context of a routine of an application and also the screenshots may be cascaded to a generated document, e.g., 'click to document' and for automation, e.g., 'click to automate'. A major constraint many organizations face when using screenshot images, is that the images contain sensitive data, such as customer personal details, bank details, health details and the like. Hence, to be able to use screenshots, the screenshots have to be automatically redacted from the sensitive data.

Current technical solutions to blur screenshots or to redact sensitive data therefrom, take the screenshots or images one at a time, which consumes time and resources, especially when in scale and requires large resources and do not scale to support more than a relatively small number of screenshots from a few dozens of users per day.

Large organizations, having thousands of users per day, such as contact centers, generate a large number of screenshots having sensitive data thereon and for further review of them or any other usage, the sensitive data has to be removed in a cost-effective manner and with minimum resources and/or reduced process time.

Therefore, there is a need for a computerized-method and computerized-system for sensitive data redaction from screenshots.

According to some embodiments of the present disclosure, since many screenshots are similar, it may be more efficient, resource and time wise, to identify differences between the screenshots and exploit identified differences in a bulk of screenshots than to analyze the screenshots one by one, thus allowing time reduction of images data-redaction even up to 20 times.

According to some embodiments of the present disclosure, the needed technical solution should support automatic blackening of a high volume of screenshots which are generated by a high volume of users, e.g., 1,000 users, in a specified amount of time, e.g., a day, in a cost-effective manner. Meaning, redating data from images with minimum resources and reduced process time. For example, when records of screenshots may be retrieved per analyst report then, before being presented to the analyst it has to be redacted, with existing technology using available resources the process of data-redaction may take a couple of days.

According to some embodiments of the present disclosure, there is thus provided a technical solution that may redact data in screenshots and store newly generated screenshots for later on retrieval and usage of the data-redacted screenshots.

FIG. 1 schematically illustrates a high-level diagram of a computerized-system 100 for sensitive data redaction from screenshots, in accordance with some embodiments of the present invention.

According to some embodiments of the present disclosure, in a system, such as computerized-system 100, one or more processors 140 may operate a module such as sensitive data redaction from screenshots 150. The sensitive data redaction from screenshots module 150 may include retrieving records of a sequence of screenshots from a database, such as database 120. Each record of a screenshot in the sequence of screenshots may include an Image Globally Unique Identifiers (GUID), one or more features. The dimension of the screenshot is the length and width of the image, i.e., screenshot. Optionally, each processor may work on one group of screenshots.

According to some embodiments of the present disclosure, the records of the sequence of screenshots may be retrieved from the database by parameters, such as agent name, application name, window title, creation date of screenshots. For example, the creation date of the screenshots or a range thereof may be used later on for grouping the screenshots by date.

According to some embodiments of the present disclosure, the plurality of databases may be stored in memory 110. The sensitive data redaction from screenshots module 150 may further group the sequence of screenshots by one feature of the one or more features to yield one or more groups. Each group may include screenshots having one common feature.

According to some embodiments of the present disclosure, optionally, each group may include screenshots having one or more common features. For example, the one or more features may be application name, agent-name and window-title.

According to some embodiments of the present disclosure, the sensitive data redaction from screenshots module 150, may further calculate a score for each pixel across all similar screenshots in each group, which is later on divided into clusters. The calculation of the score may be operated for each pixel positioned in a screenshot, as shown for example, by element 760 in FIG. 7.

According to some embodiments of the present disclosure, for each group of screenshots, the sensitive data redaction from screenshots module 150 may blacken pixels in all screenshots which have a score above a preconfigured threshold to yield data-redacted screenshots.

According to some embodiments of the present disclosure, a score of each pixel above the preconfigured threshold may indicate a high variance between screenshots in the group and a presence of sensitive data therein.

According to some embodiments of the present disclosure, the sensitive data redaction from screenshots module 150 may store the data-redacted screenshots in the screenshots-database 130.

According to some embodiments of the present disclosure, the sequence of screenshots may be generated when a user has operated one or more applications and then the sequence of screenshots has been stored in the database 120.

According to some embodiments of the present disclosure, the database 120 and the screenshots-database 130 may be the same database.

According to some embodiments of the present disclosure, optionally, the sequence of screenshots may be generated when a user reviews a display screen that is associated to the computer device.

According to some embodiments of the present disclosure, optionally, the sequence of screenshots may be generated based on a business rule, such as an application name or any other custom rule.

According to some embodiments of the present disclosure, optionally, the records of sequence of screenshots may be retrieved for a report based on a range of time, e.g., two weeks data. Alternatively, the records of sequence of screenshots may be retrieved based on a batch of screenshots which may be preconfigured to a period of time, for example, one day collected data. Another option is that the records of sequence of screenshots may be retrieved on demand.

According to some embodiments of the present disclosure, optionally, after the grouping of the sequence of screenshots, the sensitive data redaction from screenshots module 150 may further include operating a module for image rescaling for each screenshot to reduce running-time of the calculating of the score and operating images preprocessing algorithms on the screenshots to improve accuracy of the calculating of the score.

According to some embodiments of the present disclosure, the data-redacted screenshots may be uploaded from the screenshots-database 130 to a server in a cloud network to be later on reviewed by a user, such as a business analyst. Alternatively, the data-redacted screenshots may be directly uploaded to a server in the cloud network for later on review by the user.

According to some embodiments of the present disclosure, the images preprocessing algorithms may include at least one of the following algorithms: gray-scaling of each screenshot in the sequence of screenshots and operating edge-detection models on each screenshot in the sequence of screenshots.

According to some embodiments of the present disclosure, the image-rescaling may be to a preconfigured size of the original size of each screenshot, thus minimizing the number of pixels in each screenshot.

According to some embodiments of the present disclosure, the calculation of the score may be operated by a matrix similarity module, and the matrix similarity module may use an image similarity algorithm to compute similarity between each pair of screenshots from the sequence of screenshots and yield a similarity matrix. For example, 5 screenshots similarities may be represented by a similarity matrix of 5×5 where each index represents similarity level of a pair of screenshots where the diagonal is the same screenshot, as shown in FIG. 11.

According to some embodiments of the present disclosure, each record of a screenshot in the sequence of screenshots may further include a dimension of the screenshot and when screenshots in a pair of screenshots do not have a similar dimension then a computed similarity may equal zero.

According to some embodiments of the present disclosure, the sensitive data redaction from screenshots module 150 may further include applying the yielded similarity matrix to a hierarchical clustering algorithm in each group and then cutting a hierarchical tree by a preconfigured threshold to yield homogenous clusters in terms of User Interface (UI) elements where values of the UI elements are different in each screenshot in each cluster.

According to some embodiments of the present disclosure, for example the hierarchical clustering algorithm may cluster screenshots in a group of screenshots by calculating and having two most similar screenshots in a cluster and then compare clusters to have clusters of four screenshots and then of eight until the preconfigured threshold, e.g., cutting the hierarchical tree. This process of clustering may be visualized as a tree by a dendrograms graph. The similarity between screenshots in each cluster may be calculated by methods known in the art.

According to some embodiments of the present disclosure, the similarity matrix module may be template matching and the template matching may be employed on two screenshots of similar dimension to yield the similarity matrix.

According to some embodiments of the present disclosure, the template matching may be utilized or any other similarity score to measure how similar the screenshots to each other. Template matching is typically used for finding a template image or a small segment of an image within a larger image.

According to some embodiments of the present disclosure, the similarity matrix may be applied to a hierarchical clustering algorithm with a cutoff similarity of for example, 0.8. The lower the threshold, more screenshot that are less similar may be members of the same cluster.

According to some embodiments of the present disclosure, each screenshot may be an image which may be maintained in a database, such as database 120 in an encoded format and after retrieval the screenshot may be decoded.

Figure 7:
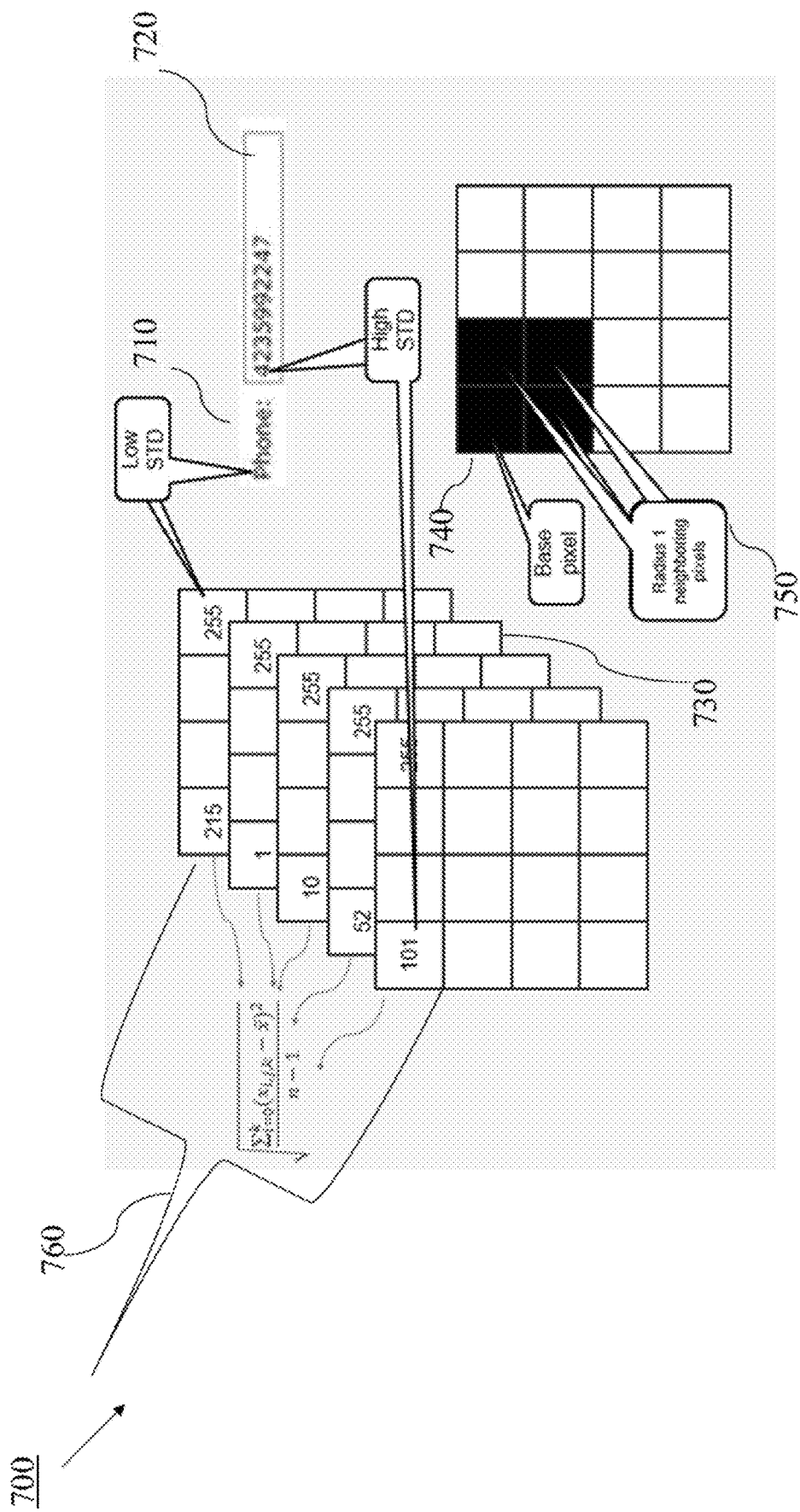
FIG. 7 schematically illustrates an example of sensitive data detection and redaction, in accordance with some embodiments of the present invention.

According to some embodiments of the present disclosure, the blackening of pixels may be further operated on pixels in a preconfigured radius from the pixels having a score above the preconfigured threshold, as shown by element 750 in FIG. 7.

According to some embodiments of the present disclosure, the score may be calculated based on Standard Deviation (STD) or any other mean of score to measure variability. For example, entropy of each pixel in the screenshots in each group of the one or more groups or randomness.

According to some embodiments of the present disclosure, sensitive areas in screenshots are characterized by high text variability that is represented by different pixel gray scale values. On the other hand, in areas in the screenshots where the text is similar across all screenshots, the pixel values across all screenshots is similar, which may be expressed by a low variance, e.g., low standard division (STD) or other mean of score measurement of variability such as entropy or randomness.

According to some embodiments of the present disclosure, a variance threshold may be set, e.g., an STD threshold, such that exceeding it may result in masking the sensitive data area by pixel blacking, as shown by element 740 in FIG. 7.

According to some embodiments of the present disclosure, in order to thicken the masking area, a pixel radius may be defined. e.g., 1 pixel, as shown by element 750 in FIG. 7, in which neighboring pixels may be also blackened in a distance of 1 pixel from the pixel having a variance score above the threshold, such as the pixel shown by element 740 in FIG. 7.

Figure 2A:
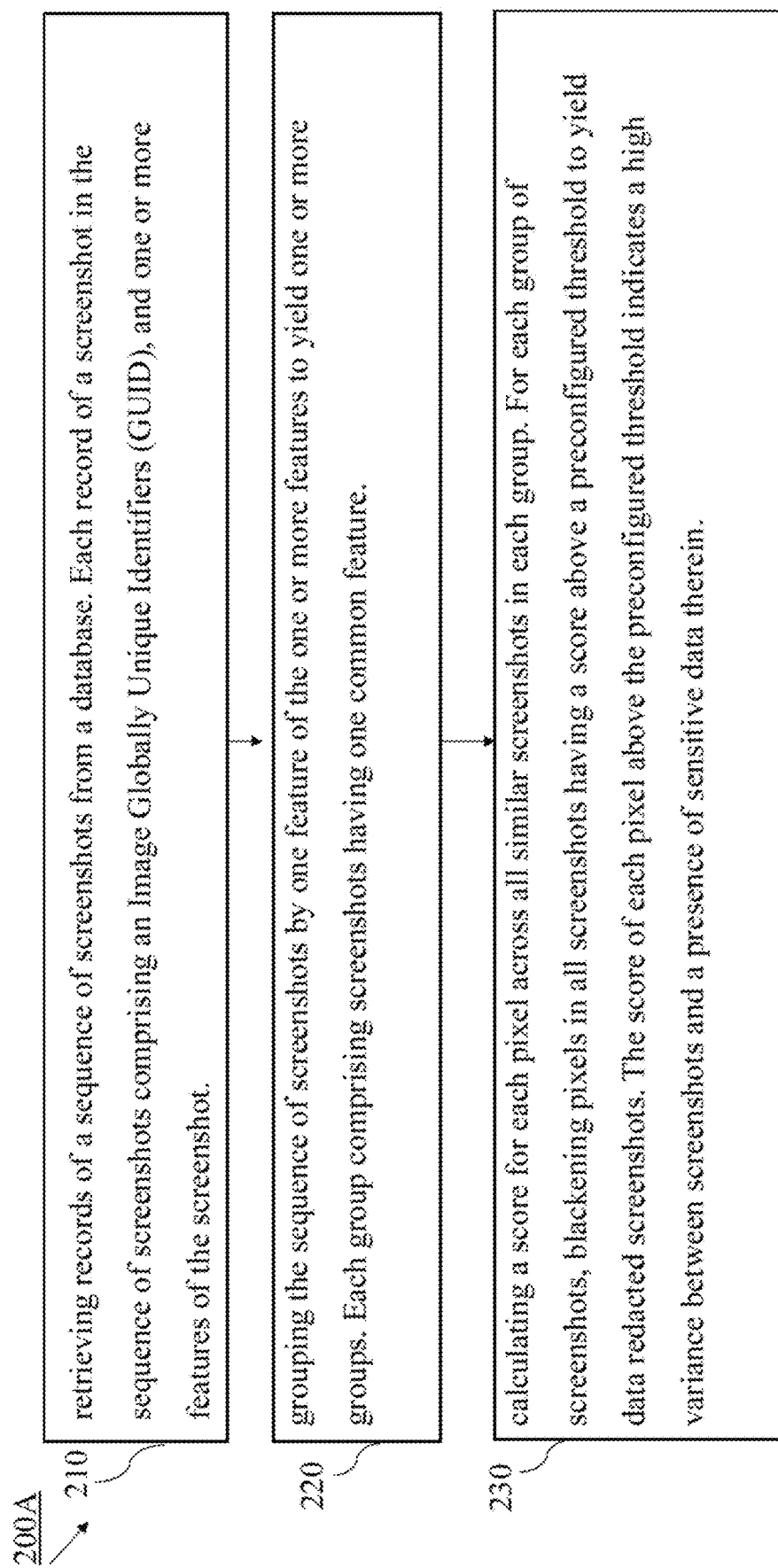
FIGS. 2A-2B schematically illustrate a high-level diagram of a computerized-method for sensitive data redaction from screenshots, in a digital multi-channel environment, in accordance with some embodiments of the present invention.
Figure 2B:
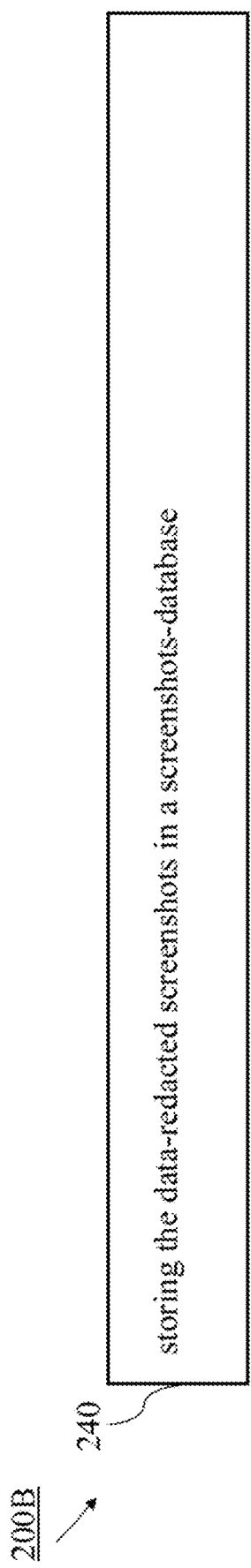

FIGS. 2A-2B schematically illustrate a high-level diagram of a computerized-method for sensitive data redaction from screenshots, in a digital multi-channel environment, in accordance with some embodiments of the present invention.

According to some embodiments of the present disclosure, operation 210 comprising retrieving records of a sequence of screenshots from a database. Each record of a screenshot in the sequence of screenshots comprising an Image Globally Unique Identifiers (GUID), and one or more features.

According to some embodiments of the present disclosure, operation 220 comprising grouping the sequence of screenshots by one feature of the one or more features to yield one or more groups. Each group comprising screenshots having a similar dimension and one common feature.

According to some embodiments of the present disclosure, operation 230 comprising calculating a score for each pixel across all similar screenshots in each group. For each group of screenshots, blackening pixels in all screenshots having a score above a preconfigured threshold to yield data redacted screenshots. The score of each pixel above the preconfigured threshold indicates a high variance between screenshots and a presence of sensitive data therein.

According to some embodiments of the present disclosure, for example, a score based on STD may be calculated out of all i,j pixels of all 'l' screenshots in a group, e.g., cluster. If a score of a pixel i,j exceeds a preconfigured threshold then the pixel i,j may be blacken in all 'l' screenshots.

According to some embodiments of the present disclosure, operation 240 comprising storing the data-redacted screenshots in a screenshots-database.

Figure 3:
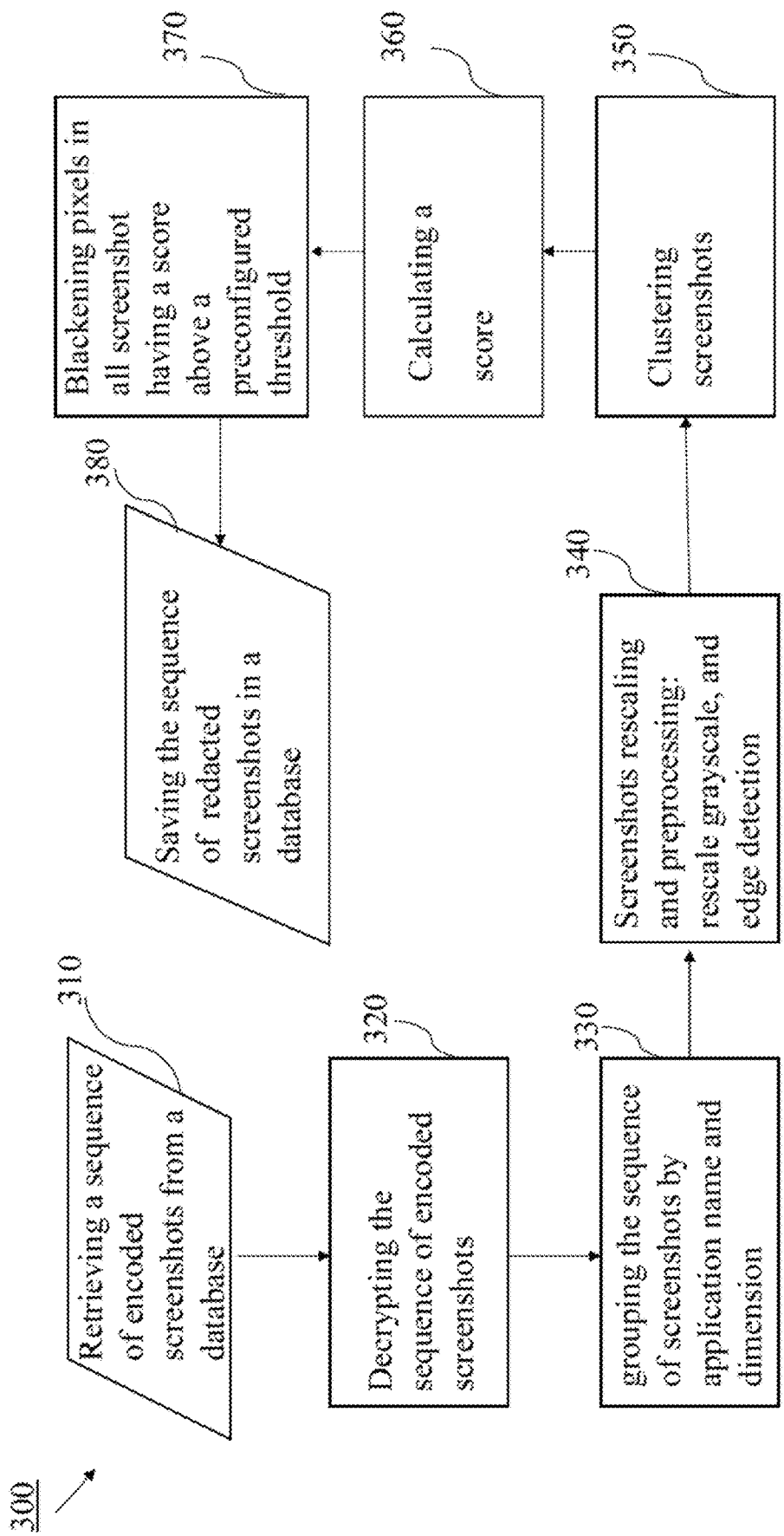
FIG. 3 schematically illustrates a high-level workflow of a sensitive data redaction from screenshots, in accordance with some embodiments of the present invention.

FIG. 3 schematically illustrates a high-level workflow 300 of a sensitive data redaction from screenshots, in accordance with some embodiments of the present invention.

According to some embodiments of the present disclosure, after one or more users have operated an application or a plurality of applications and screenshots of their work have been generated and stored in a database, such as database 120 in FIG. 1, an operation of a sensitive data redaction from the screenshots may commence. The screenshots may be stored in an encoded format.

According to some embodiments of the present disclosure, the sensitive data redaction from the screenshots may start by retrieving a sequence of screenshots from a database, 310 the database may be a database, such as database 120 in FIG. 1.

According to some embodiments of the present disclosure, decrypting the sequence of encoded screenshots 320 and then grouping the sequence of screenshots by application name and dimension 330. The grouping by dimension may be optional, and the dimension is the size of the screenshots, i.e., width and length.

According to some embodiments of the present disclosure, the grouping may be operated by one or more features other than application name, such as agent-name and window-title.

According to some embodiments of the present disclosure, optionally, to reduce processing time the screenshots may be rescaled and preprocessed. e.g., gray-scale and edge detection 340. The images, i.e., screenshots preprocessing may include at least one of: gray-scaling of each screenshot in the sequence of screenshots and operating edge-detection models on each screenshot in the sequence of screenshots. The edge-detection models implement techniques that involve computing an image gradient i.e., directional change in the intensity or color in an image, to quantify the magnitude and direction of edges in the image.

According to some embodiments of the present disclosure, after the optional rescaling of the screenshots and preprocessing operations, the screenshots may be grouped 350. The grouping of the screenshots 350 may be by one or more features, such as an application-name or any other feature and a dimension of the screenshots. Thus, relying on the fact that many screenshots are similar in size and most of the content to efficiently resource and time wise, identify differences and exploit the identified differences, i.e., high variability in the sequence of screenshots to determine the pixels that contain sensitive data.

According to some embodiments of the present disclosure, calculating a score 360 for screenshots in each group, based on a calculated variance indicator for each pixel, across all similar screenshots in each group. For each group of screenshots, blackening pixels in all screenshots having a score above a preconfigured threshold 370 to yield data redacted screenshots.

According to some embodiments of the present disclosure, the score of each pixel above the preconfigured threshold indicates a high variance between screenshots in the group and a presence of sensitive data therein.

According to some embodiments of the present disclosure, the data-redacted sequence of screenshots may be saved in a database 380, such as screenshots-database 130 in FIG. 1.

Figure 4A:
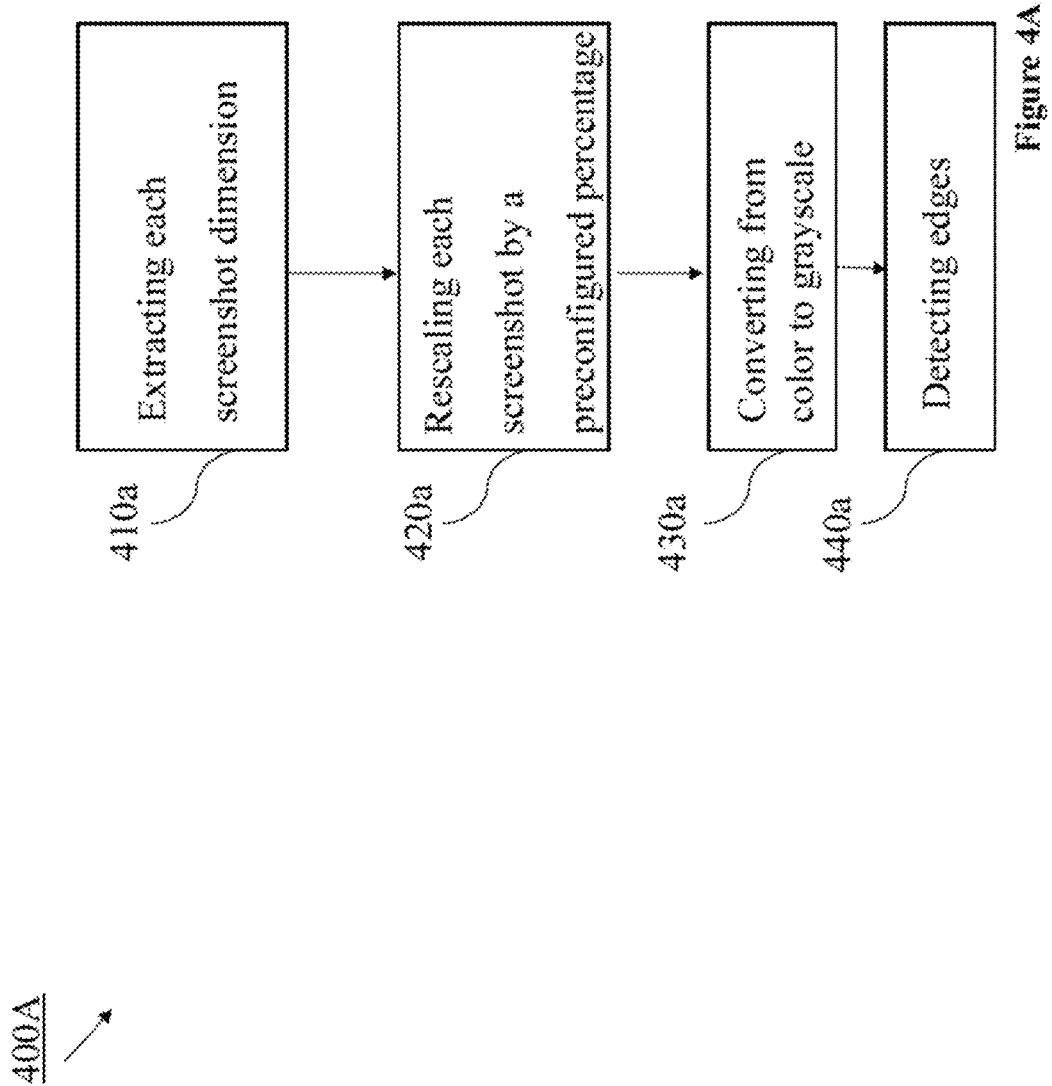

FIG. 4A schematically illustrates a high-level workflow 400A of screenshots preprocessing, in accordance with some embodiments of the present invention.

According to some embodiments of the present disclosure, the most expensive process in terms of time is to find similarity among the screenshots. Therefore, operations 410*a*-410*d* assist in reducing the processing time.

According to some embodiments of the present disclosure, the size of each screenshot may be identified by extracting each screenshot dimension 410*a*, in terms of number of pixels and length and width of each screenshot.

According to some embodiments of the present disclosure, each screenshot may be resealed by a preconfigured percentage 420*a* from the original size. For example, reducing the screenshot dimension by 4 to expedite the comparison between each pair of screenshots.

According to some embodiments of the present disclosure, to allow a better accuracy when comparing screenshots where the background is bright and dominate, converting from color to grayscale 430*a*, which is one channel screenshot compared to three channels of a Red Green Blue (RGB) screenshot followed by an edge-detection. A grayscale image is one in which the value of each pixel is a single sample representing only an amount of light; that is, it carries only intensity information. Grayscale images are composed exclusively of shades of gray.

According to some embodiments of the present disclosure, detecting the edges 440*a* or contour lines in each screenshot by operating edge-detection models on each screenshot in the sequence of screenshots which may use a standard algorithm, such as Canny. In other words, the edge detection handles the brightness issue of the background or any non-black background, and the grayscale is a necessary step beforehand.

Figure 4B:
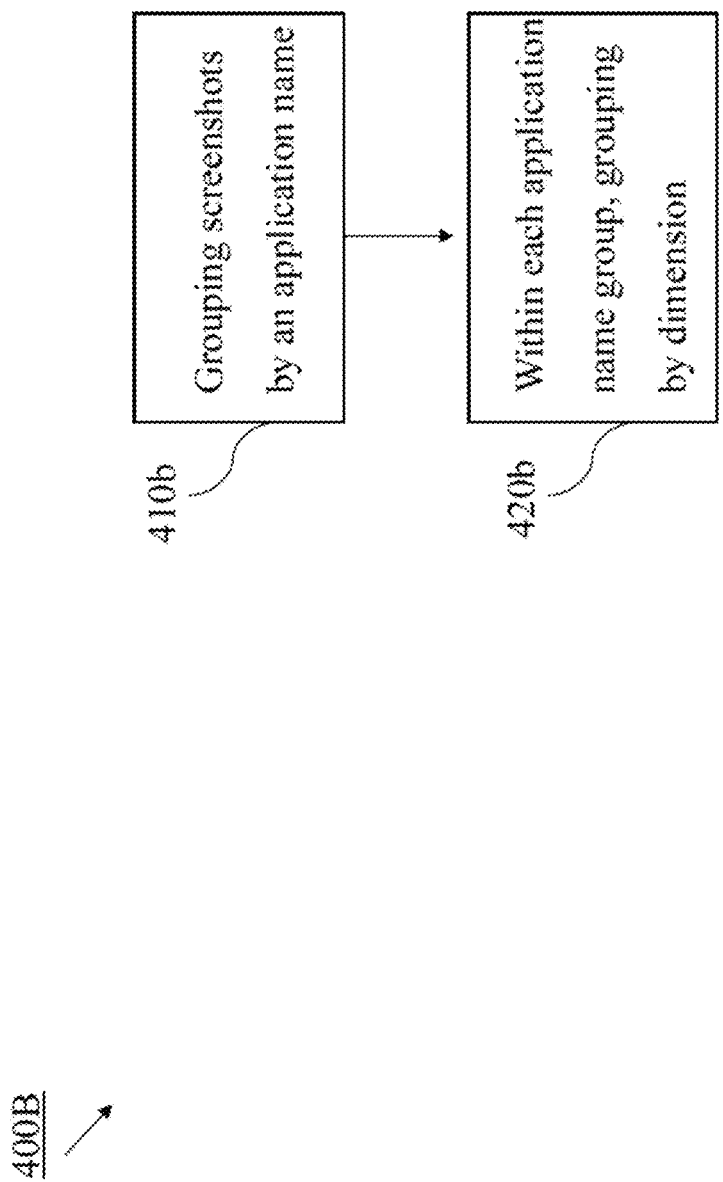

FIG. 4B schematically illustrates a high-level workflow 400B of screenshots grouping, in accordance with some embodiments of the present invention.

According to some embodiments of the present disclosure, to reduce the time complexity of screenshots comparisons the screenshots may be segmented, i.e., grouped by one or more features and size. For example, grouping by an application name and dimension given that screenshots cannot be similar if not from the same application. Moreover, screenshots must have the same dimension for the comparison and also for further steps of pixel wise aggregation, across all similar screenshots in the same group.

According to some embodiments of the present disclosure, grouping the screenshots by an application name 410*b*. The grouping may be operated by one or more features other than an application name. For example, grouping screenshots by agent name or window title.

According to some embodiments of the present disclosure, optionally, within each application name group, grouping by dimension 420*b*. Thus, creating groups of screenshots that are having similar application name and similar size.

FIG. 4C schematically illustrates a high-level workflow 400C of a sensitive data redaction from screenshots, in accordance with some embodiments of the present invention.

According to some embodiments of the present disclosure, the calculating of the score may be operated by a matrix similarity module, and the matrix similarity module may be using an image similarity algorithm to compute similarity between each pair of screenshots from the sequence of screenshots and yield a similarity matrix.

According to some embodiments of the present disclosure, the matrix similarity module may be template matching. Accordingly, calculating template matching for any pair of screenshots 410c and then yielding a similarity matrix 420c. The template matching provides a score between 0-1.

According to some embodiments of the present disclosure, given all the pairwise combination the similarity matrix is yielded having a score for each pairwise. The yielded similarity matrix may be applied to a standard hierarchical clustering algorithm in each group and then a hierarchical tree may be cut by a preconfigured threshold to yield homogenous clusters in terms of User Interface (UI) elements where values of the UI elements are different in each screenshot in each group.

According to some embodiments of the present disclosure, the outcome may be that each cluster may have similar application or web pages or any other feature that are similar in terms of the screen elements but different in terms of the elements' content, such as text within text fields.

Figure 4D:
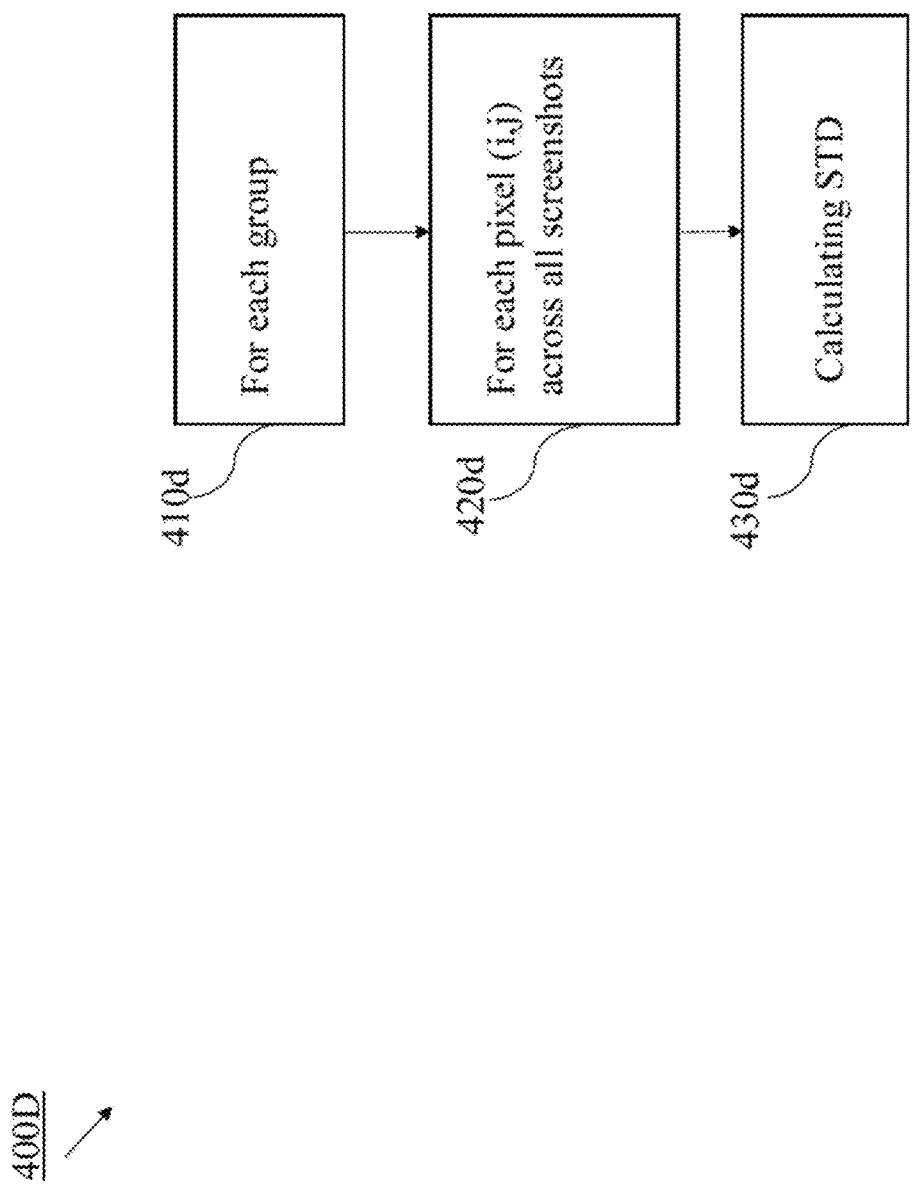

FIG. 4D schematically illustrates a high-level workflow 400D of calculating screenshots variance, in accordance with some embodiments of the present invention.

According to some embodiments of the present disclosure, for each group 410d, for each pixel (i,j) across all screenshots 420d in the group, calculating Standard Deviation (STD) 430d or any other mean of score to measure variability, such as entropy or randomness.

According to some embodiments of the present disclosure, for each pixel that has been calculated a score above a preconfigured threshold, blackening that pixel. Optionally, neighboring pixels of a pixel having a score above the preconfigured threshold, in a preconfigured radius may be blackened.

Figure 5:
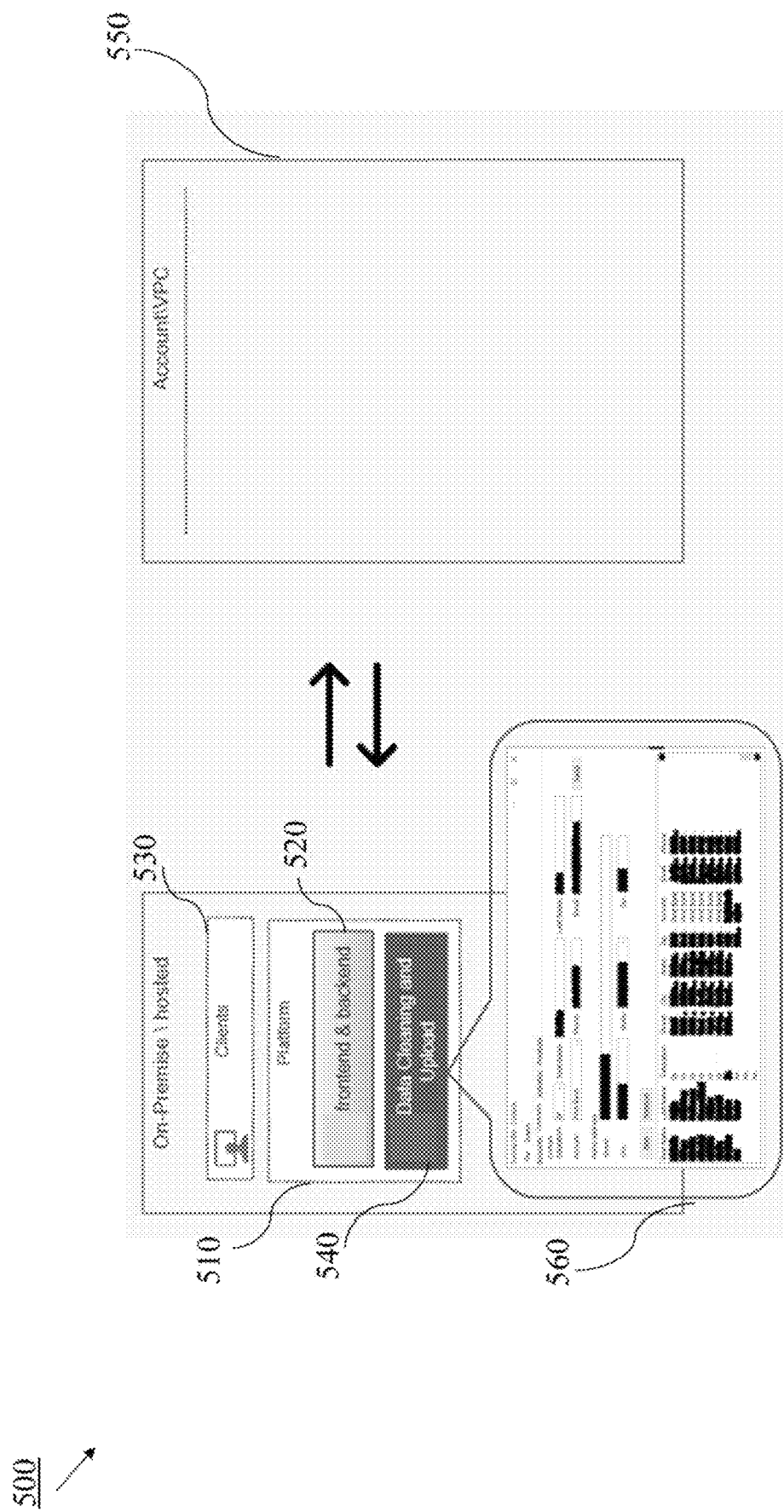
FIG. 5 schematically illustrates an example of implementation of method and system for sensitive data redaction from screenshots, in accordance with some embodiments of the present invention.

FIG. 5 schematically illustrates an example 500 of implementation of method and system for sensitive data redaction from screenshots, in accordance with some embodiments of the present invention.

According to some embodiments of the present disclosure, in a non-limiting example, an automatic process of sensitive data redaction from screenshots, as shown in FIG. 1 and FIG. 2, may commence in an on-premise or a hosted platform, such as platform 510 having a frontend and backend 520 and which is used by a high-volume of clients or users 530.

According to some embodiments of the present disclosure, a computerized-system for automatic sensitive data redaction from screenshots, as shown in FIG. 1 and a computerized-method for automatic sensitive data redaction from screenshots, as shown in FIG. 2 and such as data cleaning and upload module 540 may reside and operate in one or more on-premise servers or hosted servers to mask sensitive data, as shown by element 560, before it is uploaded to an account 550 in a Virtual Private Cloud (VPC).

Figure 6:
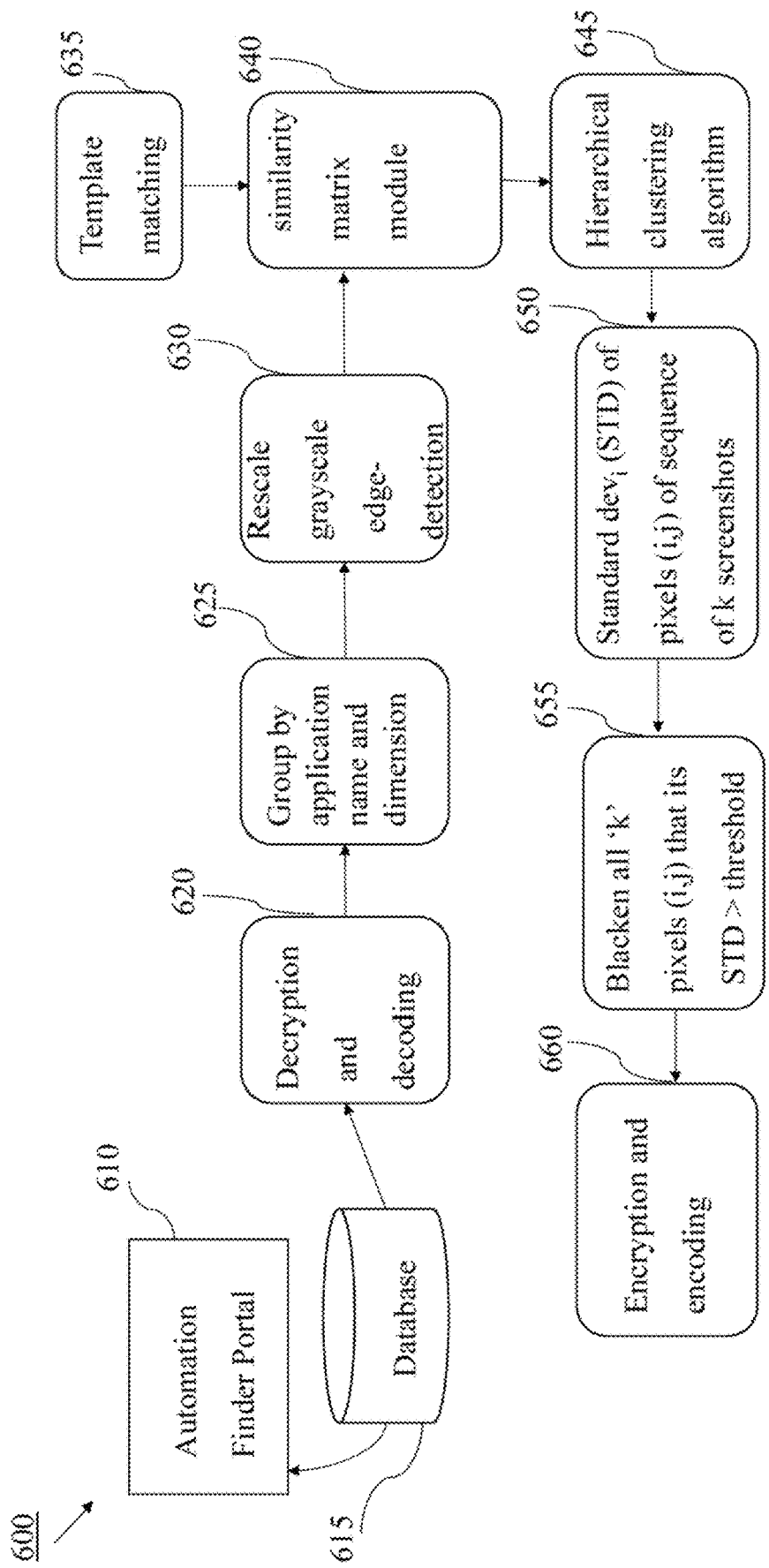
FIG. 6 schematically illustrates a high-level workflow of an example of screenshots redaction, in accordance with some embodiments of the present invention.

FIG. 6 schematically illustrates a high-level workflow 600 of an example of screenshots redaction, in accordance with some embodiments of the present invention.

According to some embodiments of the present disclosure, in a non-limiting example, in order to display a screenshot on a portal, such as an automation finder portal 610, each screenshot may be initially stored on an on-premise database, such as database 615.

According to some embodiments of the present disclosure, the format of the screenshots may be coded, e.g., in base64 format, encrypted and then stored in the database 615. The database 615 may include image Globally Unique Identifier (GUID), one or more features, and screenshot data. The GUID may include 32 alpha/numeric digits and each screenshot data may be represented by base64 encoding. The one or more features may be for example, application name, agent-name, and window-title.

According to some embodiments of the present disclosure, to retrieve records of a sequence of screenshots from the database 615, a query with the required GUIDs may be sent and the response may be a list of encoded screenshots. The list of required GUIDs may be either GUIDs of new screenshots added to the database 615 or GUIDs of screenshots used by a portal feature, such as automation finder discovery report.

According to some embodiments of the present disclosure, the required GUID of the records of sequence of screenshots may be retrieved depends on a mode of operation. For example, when it is needed for a report then the retrieval may be based on a range of time, e.g., two weeks data. Alternatively, the records of sequence of screenshots may be retrieved based on a batch of screenshots which may be preconfigured to a period of time, for example, one day collected data or newly arriving data. Another option is that the records of sequence of screenshots may be retrieved on demand.

According to some embodiments of the present disclosure, the encrypted screenshots may be decrypted and decoded 620 and then to reduce the time complexity of the masking task, i.e., sensitive data redaction from the screenshots, the retrieved screenshots may be grouped by one or more features, for example, group by application name and optionally by dimension 625. The blackening, i.e., data-redaction may be operated on original screenshots which are grouped by in operation 625.

According to some embodiments of the present disclosure, the screenshots may be grouped by to find similar screenshots in groups e.g., from the same application and with similar size. Most applications and browser window size are similar and remain constant during work.

According to some embodiments of the present disclosure, optionally, before calculating a score for screenshot similarity in each group, such as similarity matrix module 640, applying image rescaling and images preprocessing algorithms, such as grayscale and edge-detection 630.

According to some embodiments of the present disclosure, the image rescaling may be to a preconfigured percentage from the original size of the image, e.g., 25% of the original size, to reduce the comparison time. During experiments, 25% of the original dimension has been verified to be sufficient for correct screenshots comparison. To improve the quality of the score for screenshot similarity any images preprocessing algorithms may be used. For example, Canny edge detection on grayscale screenshot, to overcome the issue of dominate high intensity, e.g., white background that causes screenshots to look similar although they are not.

According to some embodiments of the present disclosure, a module to calculate a score for each pixel across all screenshots similarity in each group, e.g., for all i,j k pixels in a cluster, such as similarity matrix module 640, may use any image similarity algorithm in order to calculate bidirectional similarity score among all similar screenshots in each group. This is performed by calculating a similarity score between screenshot i and j and vice-versa. The similarity matric module may yield a similarity matrix.

According to some embodiments of the present disclosure, template matching 635 may be utilized or any other similarity score to measure how similar the screenshots to each other in each group. Template matching may be used for finding a template image, e.g., small segment of an image, within a larger image.

According to some embodiments of the present disclosure, the template matching may be employed on two screenshots of the same dimension and thus, receiving a fast and accurate screenshot similarity score, e.g., score. The yielded similarity matrix may be applied to a hierarchical clustering algorithm 645 with a preconfigured threshold, e.g., of 0.8. The lower the preconfigured threshold, more screenshots that are less similar may be grouped to the same cluster, i.e., group.

According to some embodiments of the present disclosure, having hemogenic clusters in terms of screenshots format and structure, e.g., tables, grid, fields of the application or the web page, while allowing different field values, such as text areas, ticks etc., enables measuring the variability of pixels across all screenshots in a cluster, i.e., group of screenshots.

According to some embodiments of the present disclosure, within each group finding if pixel i j carries sensitive data and needs to be blacken. For example, by using Standard Deviation (STD) of pixels (i,j) of a sequence of 'k' screenshots 650 and then blackening all 'k' pixels (i,j) having STD greater than a preconfigured threshold 655.

According to some embodiments of the present disclosure, all screenshots in the retrieved sequence of screenshots may be encrypted and encoded 660 before stored in a database or uploaded to a cloud environment.

FIG. 7 schematically illustrates an example 700 of sensitive data detection and redaction, in accordance with some embodiments of the present invention.

According to some embodiments of the present disclosure, for a key field, for example, 'phone' 710, the word 'phone' may be assumed to appear in all screenshots in the group, however, the value, i.e., the phone number 720 and specifically its digits are most likely to change from screenshot to another in a group of screenshots. In terms of pixels, the pixels of the word 'phone' will have quite similar grayscale level across all screenshots, e.g., low STD. It may be up to display settings of different displays of different users and applications, while the grayscale levels of the pixels of the phone number itself may differ across all screenshots in the group of screenshots.

According to some embodiments of the present disclosure, the grayscale level of a pixel i,j across all screenshots in a group of screenshots that represents the word 'phone' 710 or in general, a constant text or value that is displayed on a screen, may remain the same or with slight changes, therefore may have a low score, e.g., low STD. In contrast, the grayscale level of a pixel i,j across all screenshots in a group of screenshots, that represents the actual phone number 720, or in general a variable text or value that is displayed on screen may be different with large changes, e.g., high STD.

According to some embodiments of the present disclosure, a calculated score for each pixel i,j, across all screenshots in a group, e.g., a standard deviation (STD) may be high STD, when the variable text or value is different with large changes across all screenshots in the group as shown by element 760. A high STD, e.g., 30 may be considered pixels, which include sensitive data that has to be redacted. In the formula below the score is calculated for pixels i,j across all 'k' screenshots per cluster, i.e., group of screenshots.

According to some embodiments of the present disclosure, the score, for each i,j pixel across all screenshots k, may be calculated according to the following formula: whereby, $$\text{score}_k\, i, j = \sqrt{\frac{\sum_{i=0}^{k}(x_{i,j,k} - \bar{x})^2}{k-1}}$$

k is a number of screenshots in a cluster,
i,j coordinate for x,y pixel.
$\bar{x}$ is a value of all k i,j pixels.

According to some embodiments of the present disclosure, optionally, an area of neighboring pixels, e.g., pixels around each pixel that is having a score above a preconfigured threshold, may be blackened to thicken the blacking area for increased robustness. It may be operated by defining a radius, e.g., size of number of pixels, in which pixels around the pixels having the score above a preconfigured threshold, may be blackened. For example, pixel 740 may have a score above a preconfigured threshold and when the radius is set to '1', all the pixels that are adjacent to that pixel 740 including the one in diagonal 750 may be blackened.

Figure 8:
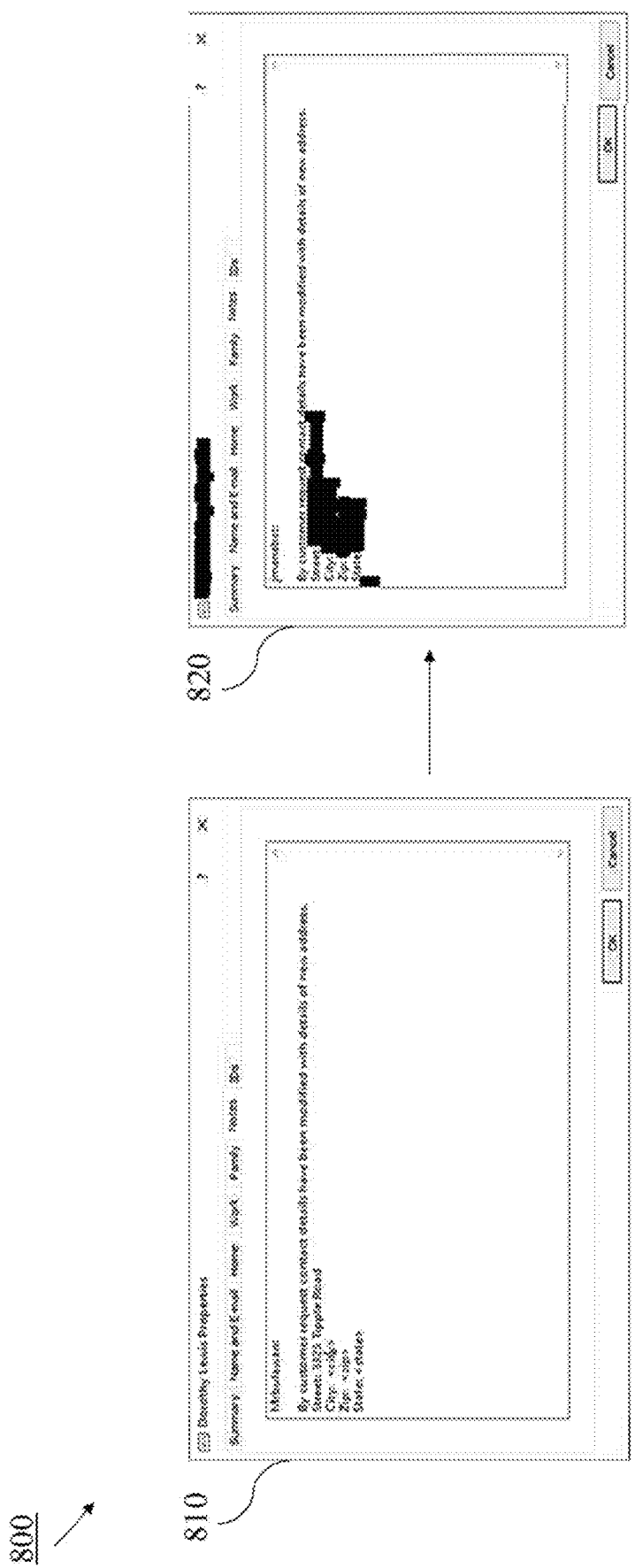
FIG. 8 shows an example of a screenshot redaction, in accordance with some embodiments of the present invention.

FIG. 8 shows an example 800 of a screenshot redaction, in accordance with some embodiments of the present invention.

According to some embodiments of the present disclosure, screenshot 810 may include sensitive data. After operating a method, such as computerized-method for sensitive data redaction from screenshots 200A-200B in FIGS. 2A-2B or a module, such as sensitive data redaction from screenshots module 150 in FIG. 1, the pixels in screenshot 810 which contain sensitive data, may be blackened and stored in a database to be later on represented to a user as screenshot 820.

Figure 9:
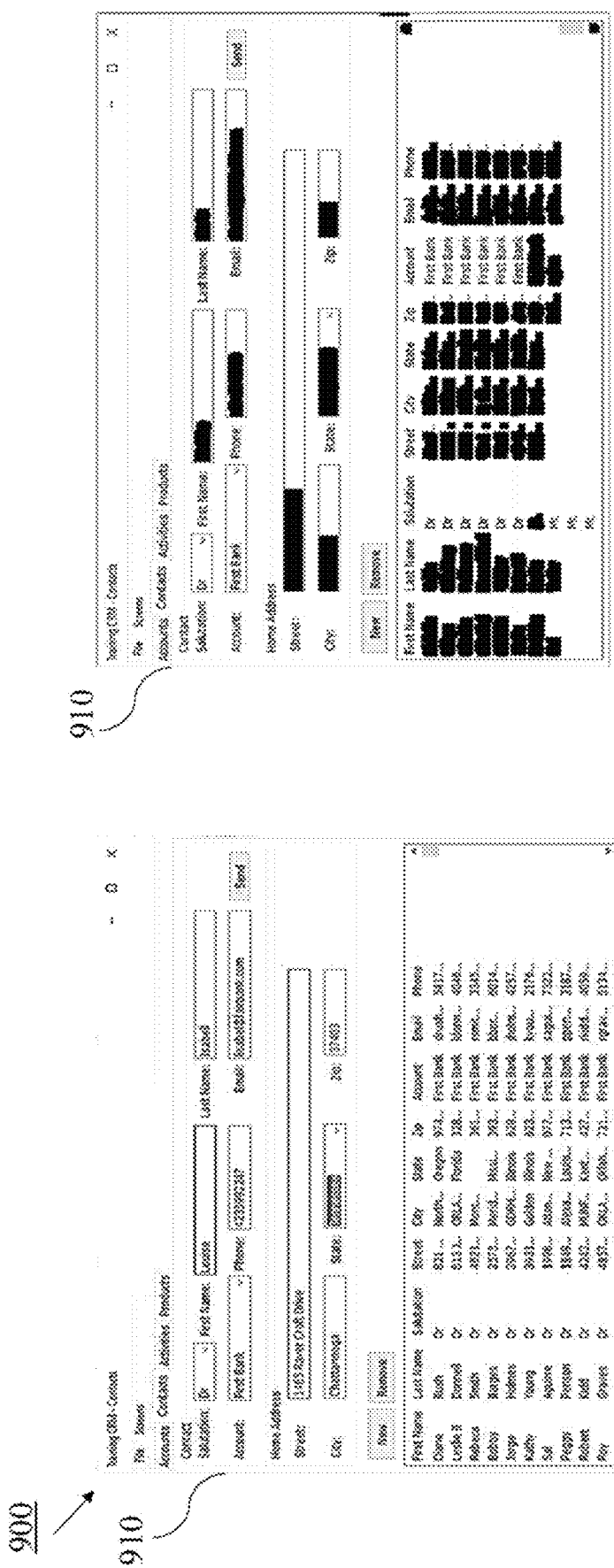
FIG. 9 shows an example of screenshot redaction, in accordance with some embodiments of the present invention.

FIG. 9 shows an example 900 of screenshot redaction, in accordance with some embodiments of the present invention.

According to some embodiments of the present disclosure, screenshot 910 may include sensitive data. After operating a method, such as computerized-method for sensitive data redaction from screenshots 200A-200B in FIGS. 2A-2B or a module, such as sensitive data redaction from screenshots module 150 in FIG. 1, the pixels in screenshot 910 which contain sensitive data, may be blackened and stored in a database to be later on represented to a user as screenshot 920.

Figure 10:
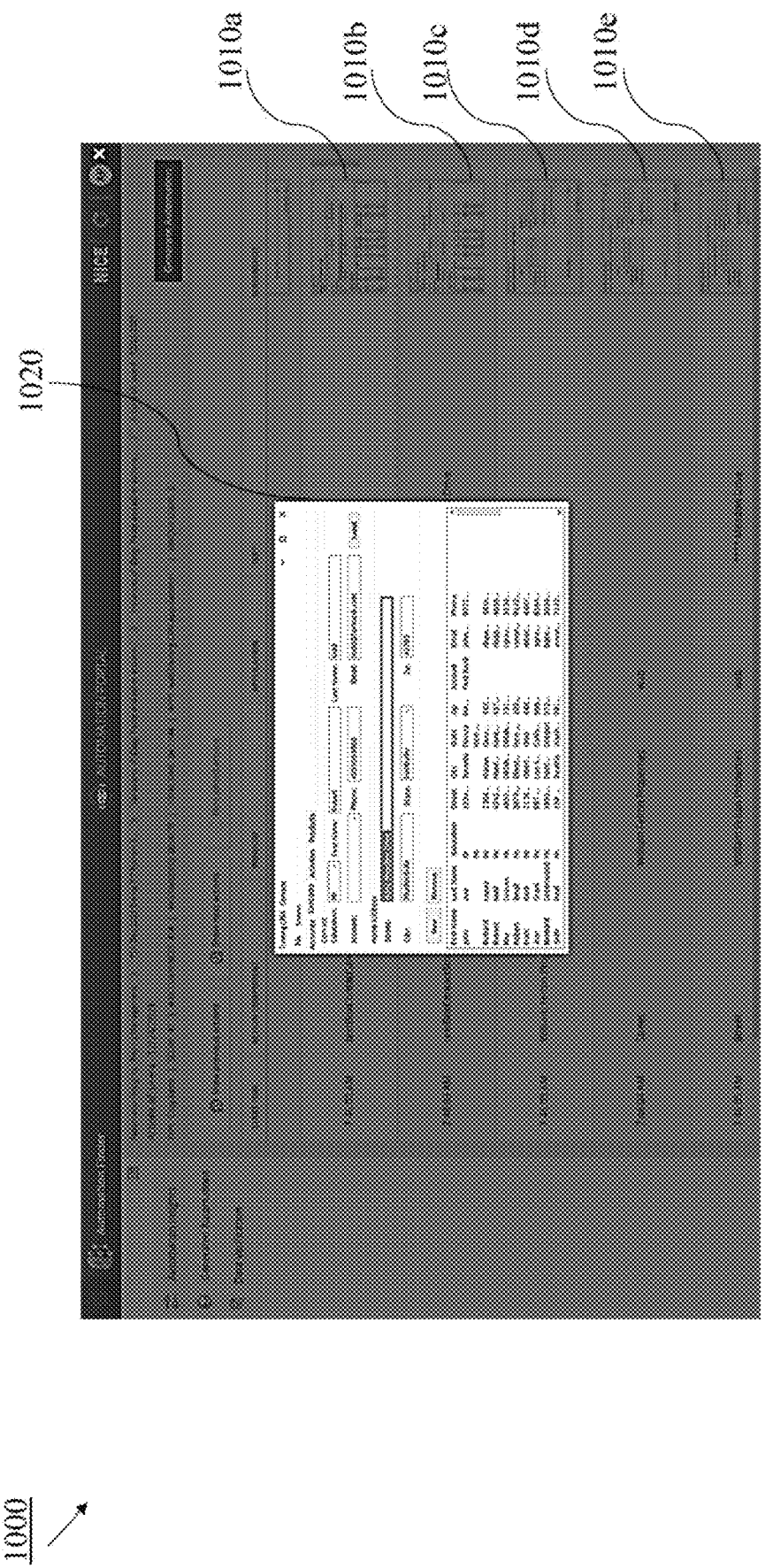
FIG. 10 shows an example of a screenshot presented to a user with no sensitive-data masking in accordance with some embodiments of the present invention.

FIG. 10 shows an example 1000 of a screenshot presented to a user with no sensitive-data masking in accordance with some embodiments of the present invention.

According to some embodiments of the present disclosure, an output from a feature of a portal, such as automatic finder action level report, each action has a screenshot, as shown by elements 1010a-1010e. Once a user is clicking on one of the screenshots, e.g., elements 1010a-1010e, the screenshot 1020 may be retrieved from a database, such as database 120 in FIG. 1 and it may be hovering and centered on the screen. Once screenshot 1020 is masked, by a system for sensitive data redaction from screenshots, such as system 100 in FIG. 1 or by a method for sensitive data redaction from screenshots, as in shown in FIGS. 2A-2B, then, sensitive data may be blackened, and the screenshot 1020 may be stored in a database, such as screenshots-database 130 in FIG. 1.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments: thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for sensitive data redaction from screenshots, said computerized-method comprising:
    retrieving records of a sequence of screenshots from a database,
        wherein each record of a screenshot in the sequence of screenshots comprising an Image Globally Unique Identifiers (GUID), and one or more features of the screenshot,
    grouping the sequence of screenshots by one feature of the one or more features to yield one or more groups, wherein each group comprising screenshots having one common feature;
    calculating a score for each pixel across all screenshots in each group,
    for each group of screenshots, blackening pixels in all screenshots having a score above a preconfigured threshold to yield data redacted screenshots,
    wherein the score of each pixel above the preconfigured threshold indicates a high variance between screenshots and a presence of sensitive data therein, and
    storing the data-redacted screenshots in a screenshots-database.

2. The computerized-method of claim 1, wherein the sequence of screenshots has been generated when a user has operated one or more applications and wherein the sequence of screenshots is stored in the database.

3. The computerized-method of claim 2, wherein the one or more features are selected from at least one of: (i) application name: (ii) agent-name; and (iii) window-title.

4. The computerized-method of claim 1, wherein after the grouping of the sequence of screenshots, said computerized-method is further comprising:
    operating a module for image rescaling for each screenshot to reduce running-time of the calculating of the score; and
    operating images preprocessing algorithms to improve accuracy of the calculating of the score.

5. The computerized-method of claim 1, wherein the data-redacted screenshots are uploaded from the screenshots-database to a server in a cloud network.

6. The computerized-method of claim 4, wherein the images preprocessing comprising at least one of: grayscaling of each screenshot in the sequence of screenshots; and operating edge-detection models on each screenshot in the sequence of screenshots.

7. The computerized-method of claim 4, wherein the image-rescaling is to a preconfigured size of an original size of each screenshot.

8. The computerized-method of claim 4, wherein the calculating of the score is operated by a matrix similarity module, and wherein said matrix similarity module is using an image similarity algorithm to compute similarity between each pair of screenshots from the sequence of screenshots and yield a similarity matrix.

9. The computerized-method of claim 8, wherein each record of a screenshot in the sequence of screenshots further comprising a dimension and wherein when screenshots in a pair of screenshots do not have similar dimension then a computed similarity equals zero.

10. The computerized-method of claim 8, wherein said computerized-method is further comprising applying the yielded similarity matrix to a hierarchical clustering algorithm in each group; and
    cutting a hierarchical tree by a preconfigured threshold to yield homogenous clusters in terms of User Interface (UI) elements where values of the UI elements are different in each screenshot in each cluster.

11. The computerized-method of claim 8, wherein the similarity matrix module is template matching and wherein said template matching is employed on two screenshots of similar dimension to yield the similarity matrix.

12. The computerized-method of claim 1, wherein each screenshot is an image which is maintained in the database in an encoded format and wherein after retrieval of each screenshot it is decoded.

13. The computerized-method of claim 1, wherein the blackening of pixels is further operated on pixels in a preconfigured radius from the pixels having a score above the preconfigured threshold.

14. The computerized-method of claim 1, wherein the score is calculated based on Standard Deviation (STD) or any other mean of score to measure variability.

15. A computerized-system for sensitive data redaction from screenshots, said computerized-system comprising:
    one or more processors;
    a database;
    a screenshots-database; and
    a memory to store the plurality of databases,
    said one or more processors are configured to:
        retrieve records of a sequence of screenshots from the database, wherein each record of a screenshot in the sequence of screenshots comprising an Image Globally Unique Identifiers (GUID), and one or more features of the screenshot,
group the sequence of screenshots by one feature of the one or more features to yield one or more groups,
wherein each group comprising screenshots having a common feature;
calculate a score for each pixel across all screenshots in each group,
for each group of screenshots, blacken pixels in all screenshots having a score above a preconfigured threshold to yield data redacted screenshots,
wherein the score of each pixel above the preconfigured threshold indicates a high variance between screenshots and a presence of sensitive data therein, and
store the data-redacted screenshots in the screenshots-database.

\* \* \* \* \*